United States Patent [19]
Viguier

[11] 3,802,662
[45] Apr. 9, 1974

[54] LEAK-PROOF DEVICE FOR CONTROLLING THE FLOW OF A FLUID IN A FLEXIBLE TUBE

[75] Inventor: Leon Fernand Viguier, Saint-Pierre de Mesage, France

[73] Assignee: Laboratoires Medicoplast, Paris, France

[22] Filed: Aug. 31, 1972

[21] Appl. No.: 285,490

[30] Foreign Application Priority Data
Sept. 13, 1971 France ............................ 71.32888

[52] U.S. Cl. ............................................. 251/342
[51] Int. Cl. ............................................. F16k 31/58
[58] Field of Search .......... 251/341, 368, 342, 347; 137/608, 609, 610

[56] References Cited
UNITED STATES PATENTS

| | | | |
|---|---|---|---|
| 2,279,834 | 4/1942 | McGee | 251/342 |
| 2,674,265 | 4/1954 | Dennis | 137/610 |
| 3,707,972 | 1/1973 | Villari et al. | 251/342 X |
| 3,325,143 | 6/1967 | Phillips | 251/368 X |
| 3,407,842 | 10/1968 | Zahuranec | 137/608 X |
| 2,692,751 | 10/1954 | Felver | 251/342 |
| 2,964,292 | 12/1960 | Noir | 251/342 |
| 3,509,904 | 5/1970 | Olson | 137/608 X |

*Primary Examiner*—Samuel Scott

[57] ABSTRACT

The control device consists of an element made of semi-resilient material and having a generally Y-shaped configuration, the three arms thereof being tubular. A central arm encloses an internal tubular ferrule, the end of which may be engaged, in a leak-proof manner, by intentional deformation of the element, in one or the other of the two other arms of the element, one of which is closed-off permanently. The device is used in particular for controlling the flow of fluids in laboratory and, especially, medical apparatuses.

5 Claims, 2 Drawing Figures

Fig. 1
Fig. 2
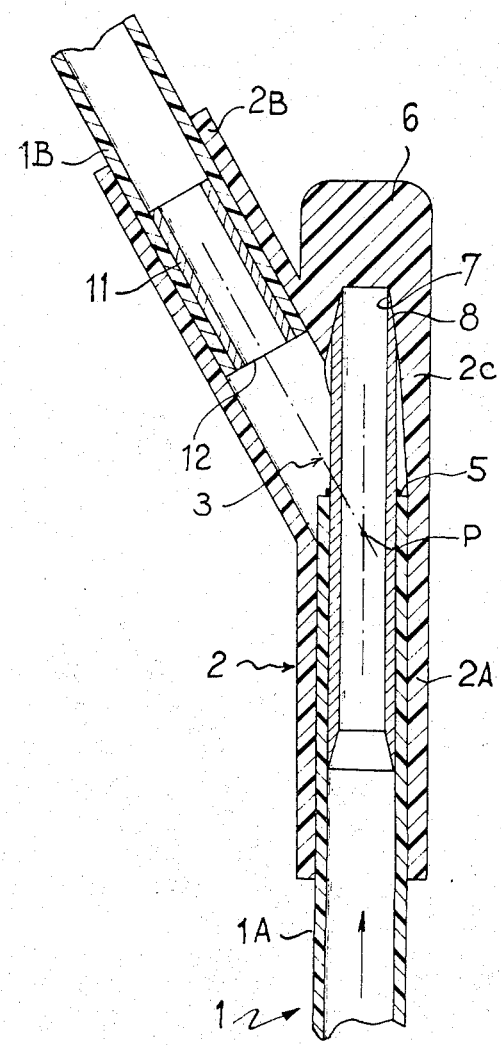
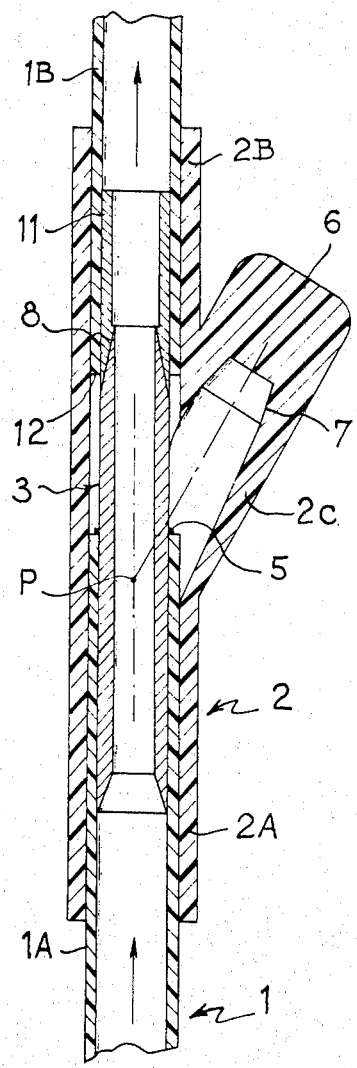

LEAK-PROOF DEVICE FOR CONTROLLING THE FLOW OF A FLUID IN A FLEXIBLE TUBE

The object of the invention is a leak-proof device for interrupting or permitting, at will, the flow of a fluid in a flexible pipe such as is used, for example, in manipulating plastic blood-collecting pouches.

It is the purpose of the invention to provide a device of this kind which is of extremely simple and of economical design, is reliable in operation and meets hygienic requirements.

To this end, the device according to the invention consists of a generally Y-shaped element made of semi-flexible material. The three arms of the said Y are tubular, the central arm containing a tubular ferrule, the end of which, located beyond the area of convergence of the three arms of the element, may be intentionally deformed in order to engage in a leak-proof manner in one of the two other arms of the element, one of which is permanently closed off.

When the device is to be used, the central arm thereof is connected upstream of the fluid circuit while, of the other two arms, the one which is not closed off is connected downstream of the circuit. The fluid in the device may be shut off or allowed to flow merely by deforming the element from the outside to allow the active end of the internal ferrule to pass either into the closed-off arm or into the other arm of the element.

A completely leak-proof device of this kind is easy to sterilize.

In one embodiment, the element made of semi-flexible material is transparent; furthermore, the internal tubular ferrule is straight and is located in the extension of the central arm of the element. It is therefore quite simple to determine whether the element is in the flow or shut-off condition by seeing whether the extension of the central arm is in the open or the closed-off arm.

The invention will be better understood by reference to the attached drawings which illustrate, by way of non-restrictive example, one form of embodiment of a fluid flow-control device according to the invention.

In the drawings:

FIG. 1 is a longitudinal section through the device in the closed position;

FIG. 2 is a similar section through the same device in the open position.

The leak-proof device for controlling the flow of a fluid in a flexible pipe 1, illustrated in the drawings, consists essentially of an element 2 and an internal tubular ferrule 3.

Element 2 is general Y-shaped and comprises three tubular arms 2A, 2B, 2C. The element is made of a semi-flexible plastic material which may be resiliently deformed, for a short period of time, for the purpose of locating, in the extension of central arm 2A, either arm 2B as shown in FIG. 2, or arm 2C as shown in FIG. 1. Element 2 is preferably transparent.

A part 1A of pipe 1 is forced into central arm 2A, while a part 1B of the same pipe is forced into arm 2B. The two parts 1A and 1B of pipe 1 may be obtained, for example, by cutting the pipe 1 into which it is desired to fit the fluid flow-control device.

Internal ferrule 3 is held in central arm 2A of element 2 and, in this example, a certain part of its length is forced into part 1A of the pipe which, in turn, is inserted into central arm 2A of the element.

Internal tubular ferrule 3 may preferably be welded to pipe 1A, as indicated at 5. In order to facilitate axial positioning, it may have a shoulder opposite the end of part 1A of the pipe. Internal tubular ferrule 3 might also be fixed directly in arm 2A of the element, adjacent part 1A of the pipe.

Arm 2C of the element is closed off by a bottom 6, the interior in the vicinity of the bottom being preferably in the form of a truncated cone, as shown at 7, thus forming a seat against which end 8, also a truncated cone of internal tubular ferrule 3, may bear in order to form a seal, as shown in FIG. 1, the pressure of the ferrule against the seat being assured by the inherent resiliency of element 2.

When element 2 is in the configuration shown in FIG. 2, the end of internal tubular ferrule 3 must engage in a leak-proof manner with part 1B of the tube. To this end, in the example of embodiment illustrated, an auxiliary ferrule 11 is forced into part 1B of the tube, to form a leak-proof joint, conical end 8 of the internal tubular ferrule engaging, in a leak-proof manner, with end 12 of the said auxiliary ferrule 11, in order to ensure continuity between parts 1A and 1B of the pipe.

Here again, contact between end 8 of the internal tubular ferrule with the internal surface of end 12 of the auxiliary ferrule is assured by the inherent resiliency of the material of which element 2 is made.

Seat 7 and corresponding end 12 of ferrule 11 are located at the same distance from point of convergence P of the axes of the three arms of element 2.

As a variant, the seat against which the end of the internal tubular ferrule bears when the fluid is flowing may be formed by an internal shoulder in arm 2B of the element, or by the corresponding end of part 1B of the pipe.

Arm 2A of the element is preferably connected upstream in the circuit in which it is desired to control the flow of the fluid, especially a liquid, whereas arm 2B is connected in the downstream portion of the circuit. When the configuration shown in FIG. 1 is imparted to element 2, the flow of fluid is shut off, since internal tubular ferrule 3, connected to part 1A of the pipe, abuts against the closed-off bottom of arm 2C of the element. On the other hand, if element 2 is slightly deformed and elongated, to remove end 8 of the internal tubular ferrule from closed-off arm 2C, and if the element is then flexed to allow the ferrule to move into the extension of the other arm 2B of the element, and if the element is then released, then end 8 of the internal tubular ferrule will engage with auxiliary ferrule 11, thus ensuring continuity between the two parts 1A and 1B of the pipe.

It is to be understood that the invention is by no means restricted to the form of execution described and illustrated, but may be modified, according to the purpose for which it is to be used, without departing from the scope of the invention. For example, the device might contain more than two arms, for instance four or five, in which case the ferrule could be engaged selectively with one arm, to allow fluid to flow through that arm and flexible pipe 1.

What I claim is:

1. A leak-proof device for controlling the flow of a fluid in an array of pipes comprising: an element made of semi-resilient synthetic material and including a plurality of cylindrical tubular arms of substantially identical circular cross-section, said plurality consisting of a median arm and at least two other arms converging to said median arm; the arms of said plurality opening outside said element being adapted to be assembled in a leak-proof manner to the ends of the pipes; a tubular cylindrical rectilinear ferrule having a substantially uniform cross-section throughout its length and an outer diameter substantially equal to the inner diameter of said median arm, said ferrule being made of a material having a hardness value greater than that of said semi-resilient synthetic material of said element; one end of said ferrule being permanently fixed in said median arm, the opposite end being adapted to be engageably received, by deformation of said element in the longitudinal direction of said ferrule, in a seat provided in a corresponding converging arm; the distances between the seats of said converging arms and the convergence point of said converging arms being equal to one another and being smaller than the length of that part of said ferrule extending beyond the convergence point in a converging arm, whereby the flow of fluid may be oriented at will in any of the pipes of said array.

2. A device as defined in claim 1 wherein said synthetic material is transparent.

3. A leak-proof device for controlling the flow of a fluid in an array of two pipes comprising: an element made of a semi-resilient synthetic material and including three cylindrical tubular arms of substantially identical circular cross-section, said three arms consisting of a median arm and two arms converging to said median arm; one of said two converging arms being closed-off at one end thereof; the other coverging arm and said median arm being adapted to be assembled in a leak-proof manner to the ends of the two pipes; a tubular cylindrical rectilinear ferrule having a substantially uniform cross-section throughout its length and an outer diameter substantially equal to the inner diameter of said median arm, said ferrule being made of a material having a hardness value greater than that of said semi-resilient synthetic material of said element; one end of said ferrule being permanently fixed in said median arm, the opposite end of said ferrule being adapted to be received in two positions: a first position where said opposite end is engageable, by deformation of said element in the longitudinal direction of said ferrule, in a seat provided in the closed-off converging arm whereby the flow of fluid is interrupted; and a second position wherein said opposite end is engageable, by deformation of said element in the longitudinal direction of said ferrule, in a seat in the other non-closed-off converging arm whereby the fluid may flow in the two pipes in communication.

4. A device as defined in claim 3 wherein said opposite end of said ferrule is shaped in the form of a truncated cone; the closed-off coverging arm of said element including a truncated-conical seat conjugated with the shape of said opposite end of said ferrule; the non-closed-off converging arm of said element including a truncated-conical seat conjugated with the shape of said opposite end of said ferrule.

5. A device as defined in claim 4 wherein the ends of said pipes are fitted into the open ends of said element; said ferrule being inserted in a pipe, which is inserted in said median arm of said element; said ferrule including a shoulder in abutment against the end of the pipe in which said ferrule is inserted; said seat in said converging open-arm of said element is situated in said pipe which is inserted in said arm.

* * * * *